(12) United States Patent
Denney, Jr. et al.

(10) Patent No.: US 12,359,093 B2
(45) Date of Patent: Jul. 15, 2025

(54) TAPE KIT FOR SEALING A PACKAGE

(71) Applicant: Pratt Corrugated Holdings, Inc., Brookhaven, GA (US)

(72) Inventors: Joel C. Denney, Jr., Tyrone, GA (US); Greg Sollie, Sharpsburg, GA (US); Don Joe Mikell, II, Huntsville, AL (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 0 days.

(21) Appl. No.: 18/661,200

(22) Filed: May 10, 2024

(65) Prior Publication Data
US 2024/0409778 A1     Dec. 12, 2024

Related U.S. Application Data

(60) Provisional application No. 63/471,737, filed on Jun. 7, 2023.

(51) Int. Cl.
| | | |
|---|---|---|
| B65D 71/00 | (2006.01) | |
| B65H 75/00 | (2006.01) | |
| C09J 7/22 | (2018.01) | |

(52) U.S. Cl.
CPC ............... C09J 7/22 (2018.01); B65H 75/00 (2013.01); *C09J 2203/334* (2013.01)

(58) Field of Classification Search
CPC ................................. B65H 75/00; C09J 7/22
USPC ...... 206/411, 447, 459.5, 461, 776–778, 806, 206/813; 229/198.1, 198.3, 199, 125.37, 229/125.38, 125.39; 428/40.1, 41.7, 42.2, 428/42.3
See application file for complete search history.

(56) References Cited

U.S. PATENT DOCUMENTS

| | | | |
|---|---|---|---|
| 1,128,192 A | | 2/1915 | Smith |
| 3,031,359 A | * | 4/1962 | Blank .................. C09J 7/20 206/820 |
| 3,806,024 A | | 4/1974 | Marchesani |
| 4,066,167 A | | 1/1978 | Hanna et al. |
| 4,126,213 A | | 11/1978 | McDonald |
| 4,351,877 A | * | 9/1982 | Williams .................. C09J 7/29 428/350 |
| D306,256 S | | 2/1990 | Hsu |
| 4,902,141 A | | 2/1990 | Linnewiel |

(Continued)

FOREIGN PATENT DOCUMENTS

| | | |
|---|---|---|
| CN | 306341089 | 2/2021 |
| DE | 19734946 | 2/1999 |
| DE | 202012002078 | 5/2012 |

OTHER PUBLICATIONS

Article entitled: "Peel & Seal", located at <https://sealstrip.com/peel-and-seal/>, accessed on Aug. 1, 2023, 4 pgs.

(Continued)

*Primary Examiner* — Luan K Bui
(74) *Attorney, Agent, or Firm* — Taylor Duma LLP

(57) ABSTRACT

A tape kit includes an outer packaging; a first end tape strip configured to seal a first end seam of a package; a second end tape strip configured to seal a second end seam of the package; and a transverse tape strip configured to seal a transverse seam of the package, wherein each of the first end tape strip, the second end tape strip and the transverse tape strip are at least partially surrounded by the outer packaging in a packaged configuration.

15 Claims, 11 Drawing Sheets

(56) References Cited

U.S. PATENT DOCUMENTS

| | | | |
|---|---|---|---|
| 4,911,563 A | | 3/1990 | Ciani et al. |
| 5,064,060 A | * | 11/1991 | Connell ............ B65D 73/0028 |
| | | | 206/460 |
| D395,005 S | | 6/1998 | Burton |
| 5,772,331 A | | 6/1998 | Irace et al. |
| 5,798,159 A | * | 8/1998 | Callahan, Jr. ......... B42D 5/003 |
| | | | 428/41.9 |
| D403,863 S | | 1/1999 | Briganti |
| 5,855,434 A | | 1/1999 | Hagen |
| D432,907 S | | 10/2000 | Hyde |
| RE37,764 E | * | 6/2002 | Good ................ B65D 73/0064 |
| | | | 206/460 |
| D458,018 S | | 6/2002 | Mentken |
| 6,517,243 B2 | | 2/2003 | Huffer et al. |
| D471,436 S | | 3/2003 | Robin Marieton et al. |
| 6,726,772 B2 | * | 4/2004 | Owed, Jr. ............... B05B 5/082 |
| | | | 118/500 |
| D497,542 S | | 10/2004 | McCormick |
| D593,753 S | | 6/2009 | Quick et al. |
| 7,708,463 B2 | | 5/2010 | Sampaio Camacho |
| D680,329 S | | 4/2013 | Krotts |
| 8,794,834 B2 | | 8/2014 | Forman |
| D715,657 S | | 10/2014 | Montanaro, Jr. |
| D741,195 S | | 10/2015 | Nickla |
| D773,820 S | | 12/2016 | Potters |
| D774,749 S | | 12/2016 | Ciptak |
| D793,084 S | | 8/2017 | Blanc |
| D814,784 S | | 4/2018 | Barlier |
| D854,421 S | | 7/2019 | Snavely |
| D878,049 S | | 3/2020 | Knight |
| 10,954,016 B2 | | 3/2021 | Linnewiel |
| D915,700 S | | 4/2021 | Chang Chien |
| 11,273,232 B2 | | 3/2022 | Placik |
| D962,785 S | | 9/2022 | Valentini |
| 2006/0208045 A1 | * | 9/2006 | Chandaria ............ B65D 5/0236 |
| | | | 229/102 |
| 2011/0052762 A1 | | 3/2011 | Flieger et al. |
| 2011/0100849 A1 | | 5/2011 | Thompson |
| 2019/0144166 A1 | | 5/2019 | Amigoni et al. |
| 2019/0359391 A1 | | 11/2019 | Trueax et al. |
| 2021/0300631 A1 | | 9/2021 | Kohn et al. |
| 2023/0096147 A1 | | 3/2023 | Nedwick |
| 2023/0227211 A1 | | 7/2023 | Ellis |

OTHER PUBLICATIONS

TESA; Article entitled: "Resealable Bag Closure—Single-Sided Solutions", located at <https://www.tesa.com/en/industry/food-industry/inner-packaging/resealable-bag-closure-single-sided-solutions>, accessed on Aug. 1, 2023, , 6 pgs.

Clear Resealable Tape (multiple sizes), available at sav-onbags.com, earliest customer review date Mar. 4, 2017 [online], site visited Oct. 22, 2024, available from the internet URL: https://www.sav-onbags.com/Clear-Resealable-Tape-multiple-sizes_p_311.html (Year: 2017).

Denney Jr., Joel C.; Non-Final Office for Design U.S. Appl. No. 29/949,902, filed Jun. 28, 2024, mailed Nov. 6, 2024, 17 pgs.

Resealable Tape Strips for Laminated Packaging, available at interplas.com, date not available [online], site visited Oct. 22, 2024, available from the internet URL: https://www.interplas.com/resealable-tape-p-sgrt-rsto01 (Year: 2024).

This goldfish bag . . . , available at reddit.com, posted Oct. 2017 [online], site visited Oct. 22, 2024, available from the internet, URL: https://www.reddit.com/r/mildlyinteresting/comments/8g8omk/this_goldfish_bag_comes_with_its_own_strip_of/ (Year: 2017), URL: https://www.reddit.com/r/mildlyinteresting/comments/8g8omk/this_goldfish_bag_comes_with_its_own_strip_of/ (Year: 2017).

Denney Jr., Joel C.; Final Office Action for U.S. Appl. No. 29/949,902, filed Jun. 28, 2024, mailed Mar. 4, 2025, 10 pgs.

Denney Jr., Joel C.; Notice of Allowance for U.S. Appl. No. 29/949,902, filed Jun. 28, 2024, mailed May 20, 2025, 12 pgs.

* cited by examiner

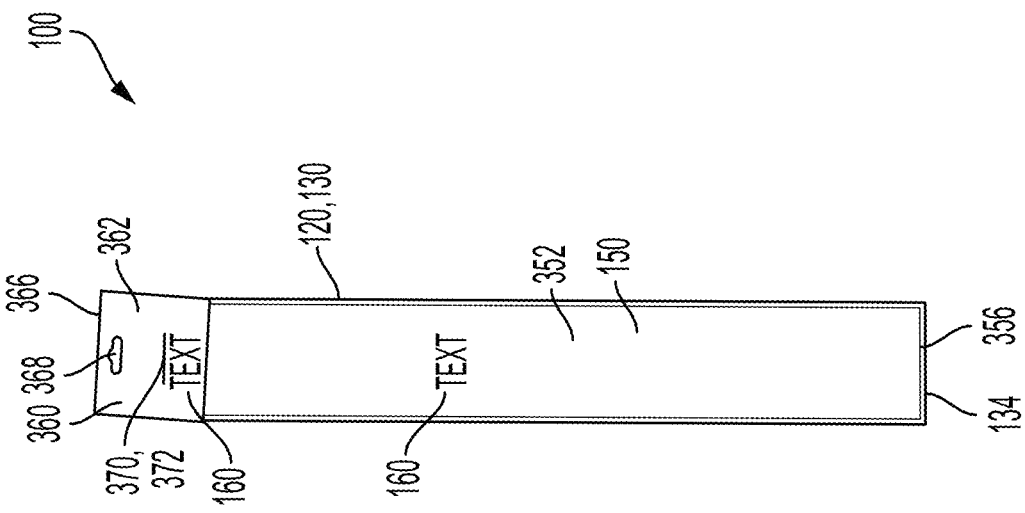
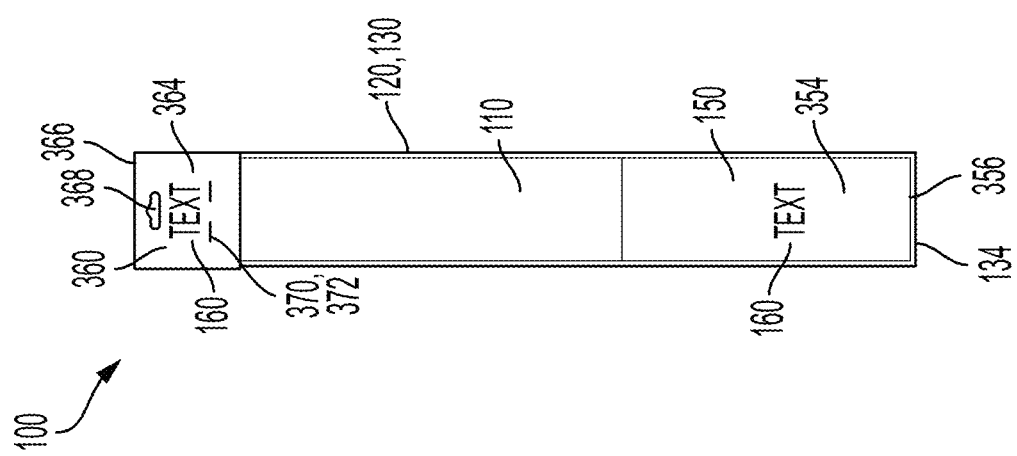

TAPE KIT FOR SEALING A PACKAGE

CROSS-REFERENCE TO RELATED APPLICATIONS

The present application claims the benefit of U.S. Provisional Application No. 63/471,737, filed Jun. 7, 2023, which is hereby specifically incorporated by reference herein in its entirety.

TECHNICAL FIELD

This disclosure relates to packaging. More specifically, this disclosure relates to a tape kit for securing a package in a closed configuration.

BACKGROUND

Packages, such as boxes for example, must be properly sealed in a closed configuration for transportation. Often, boxes are sealed with tape. However, tape may not be readily available when the box is being sealed or the tape may not be of suitable quality or quantity for properly sealing the box.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is tape kit comprising an outer packaging; a first end tape strip configured to seal a first end seam of a package; a second end tape strip configured to seal a second end seam of the package; and a transverse tape strip configured to seal a transverse seam of the package, wherein each of the first end tape strip, the second end tape strip and the transverse tape strip are at least partially surrounded by the outer packaging in a packaged configuration.

Also disclosed is a tape kit system comprising a tape kit comprising: a pre-cut tape strip configured to seal a package in a closed configuration; and an outer packaging at least partially surrounding the pre-cut tape strip in a packaged configuration; wherein at least one of the pre-cut tape strip and the outer packaging comprises indicia indicating an appropriate size of the package.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 3 is front view of the tape kit in the packaged configuration, in accordance with another aspect of the present disclosure.

FIG. 4 is a rear view of the tape kit of FIG. 3 in the packaged configuration.

DETAILED DESCRIPTION

Figure 1:
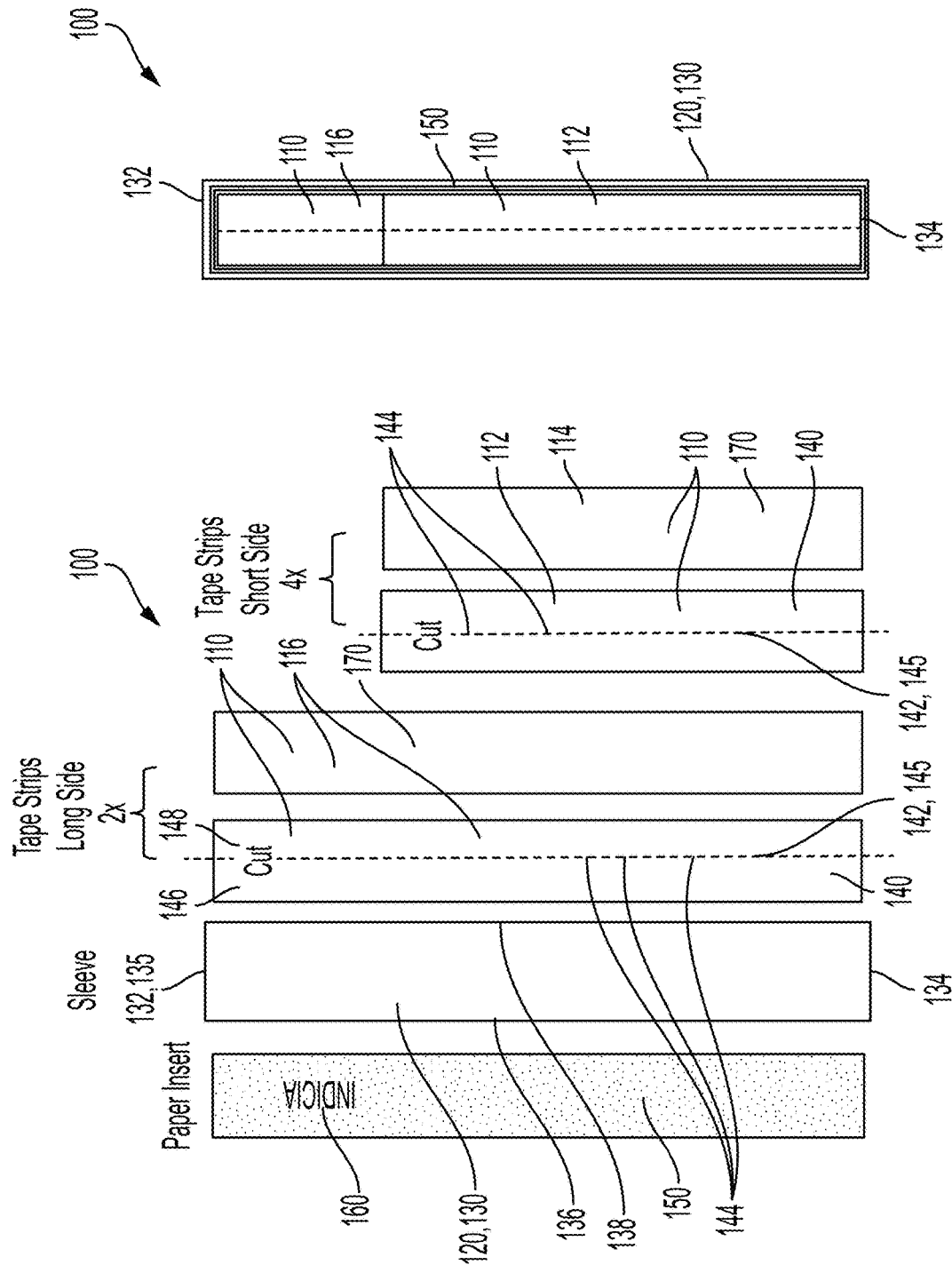
FIG. 1A is a front view of a tape kit in an unpackaged configuration, in accordance with one aspect of the present disclosure.
FIG. 1B is a front view of the tape kit of FIG. 1A in a packaged configuration.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a tape kit and associated methods, systems, devices, and various apparatus. Example aspects of the tape kit can comprise one or more pre-cut tape strips for sealing a package in a closed configuration. It would be understood by one of skill in the art that the tape kit is described in but a few exemplary embodiments among many. No particular terminology or description should be considered limiting on the disclosure or the scope of any claims issuing therefrom.

FIGS. 1A and 1B illustrate front views of a tape kit 100 in an unpackaged configuration and a packaged configuration, respectively, in accordance with one aspect of the present disclosure. Example aspects of the tape kit 100 can comprise at least one or more pre-cut tape strips 110 that can be configured to seal a package 200 (shown in FIG. 2) in a closed configuration. The package 200 can be, for example and without limitation, a box 210 (shown in FIG. 2), a bag, an envelope, or the like. In example aspects, the box 210 or other package 200 can be sealed closed in an expanded configuration (shown in FIG. 2) with the pre-cut tape strips 110 for mailing or shipping the box 210.

Figure 6:
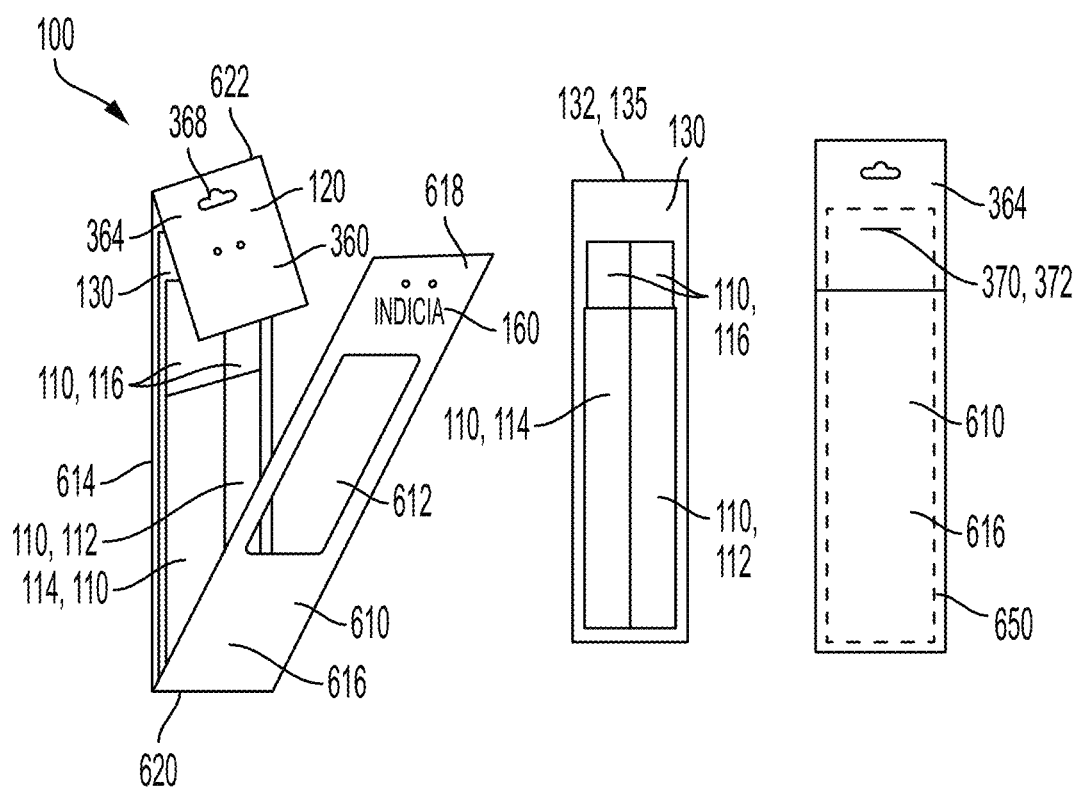
FIG. 6 illustrates various views of the tape kit in accordance with another aspect of the present disclosure.

Example aspects of the tape kit 100 can further include an outer packaging 120, which can include an outer sleeve 130 in the present aspect. The outer sleeve 130 can define an interior within which the one or more pre-cut tape strips 110 can be received in the packaged configuration (shown in FIG. 1B) of the tape kit 100. Example aspects of the outer sleeve 130 can comprise a transparent or translucent plastic material for visibility into the interior thereof. In some aspects, the outer sleeve 130 can be substantially opaque, but can define a substantially transparent or translucent window portion integrally formed therewith for visibility of the pre-cut strips 110. In other aspects, the outer sleeve 130 can comprise any other material, such as paper for example and without limitation, or any combination of materials, such as a combination of paper and plastic for example and without limitation (as shown in the embodiment of FIG. 6). The outer sleeve 130 can define an upper sleeve end 132 and a lower sleeve end 134 opposite the upper sleeve end 132. The outer sleeve 130 can further define a first sleeve side 136 extending between the upper and lower sleeve ends 132,134 and a second sleeve side 138 opposite the first sleeve side 136 and extending between the upper and lower sleeve ends 132, 134.

In the present aspect, the upper sleeve end 132 of the outer sleeve 130 can define an opening 135 through which the pre-cut tape strips 110 can be inserted into the interior thereof. The opening 135 of the outer sleeve 130 can be sealed closed to retain the pre-cut tape strips 110 in the interior in the packaged configuration. For example, the opening 135 can be sealed closed by any suitable fastener or fastening technique, including but not limited to, glue, staples, ultrasonic or heat sealing, and the like. In other aspects, any of the lower sleeve end 134, the first sleeve side 136, or the second sleeve side 138 can define the opening 135 of the outer sleeve 130.

In the unpackaged configuration (shown in FIG. 1A), the pre-cut tape strips 110 can be removed from the interior of the outer sleeve 130 to be used for sealing the box 210 in the closed configuration. For example, the opening 135 can be unsealed to remove the pre-cut tape strips 110 through the opening 135. In the present aspect, the tape kit 100 can be configured for sealing the box 210 at both a top box end 212 (shown in FIG. 2) and a bottom box end 712 (shown in FIG. 7) thereof. In other aspects, the tape kit 100 can be configured for sealing the box 210 at only one of the top box end 212 and the bottom box end 712. In other aspects, the tape kit 100 can be configured to seal any other portions of the box 210 or any other suitable type of package 200.

The pre-cut tape strips 110 for sealing both the top box end 212 and the bottom box end 712 can include a pair of first end tape strips 112, a pair of second end tape strips 114, and a pair of transverse tape strips 116. Each of the top box end 212 and the bottom box end 712 can be sealed with one of the first end tape strips 112, one of the second end tape strips 114, and one of the transverse tape strips 116. According to example aspects, each of the first end tape strips 112 and second end tape strips 114 can be about equal in length, while a length of the transverse tape strips 116 can be greater than the length of the first and second end tape strips 112, 114. In other aspects, the lengths of the pre-cut tape strips 110 can vary depending upon the dimensions of the package 200 that the tape kit 100 is intended to seal. Moreover, other aspects of the tape kit 100 can comprise more or fewer of the pre-cut tape strips 110 for sealing the top box end 212 and/or bottom box end 712 and/or any other portion of the box 210.

Each of the pre-cut tape strips 110 can define an adhesive side and a non-adhesive side opposite the adhesive side. For example, in some aspects, each of the pre-cut tape strips 110 can comprise a base layer 170, such as a plastic material for example and without limitation, and an adhesive can be applied to one side of the base layer 170. The adhesive can define the adhesive side of the pre-cut tape strip 110, and the base layer 170 can define the non-adhesive side. In example aspects, a peelable layer 140 of material, such as a paper material for example and without limitation, can be applied to the adhesive side of each pre-cut tape strip 110 to cover and protect the adhesive prior to use.

The peelable layer 140 can be selectively peeled away from the adhesive side prior to applying the pre-cut tape strip 110 to the box 210 or other package 200. In some aspects, the peelable layer 140 can be cut or otherwise weakened along a longitudinal centerline 142 thereof to facilitate removing the peelable layer 140 from the pre-cut tape strip 110. For example, in the present aspect, the peelable layer 140 can comprise a plurality of perforations 144 defining a cut line 145 along the longitudinal centerline 142. In other aspects, the cut line 145 can be formed as one continuous cut along the length of the peelable layer 140. The cut line 145 can section the peelable layer 140 into a first peelable strip 146 and an adjacent second peelable strip 148. Bending or folding the pre-cut tape strip 110 at the cut line 145 can unstick the first and second peelable strips 146,148 from the adhesive along the cut line 145, allowing the first and second peelable strips 146,148 to be gripped at the cut line 145 and peeled away by a user. Other aspects of the peelable layer 140 may not comprise the cut line 145. In other aspects, a tab of the peelable layer 140 can overhang an outer edge of the pre-cut tape strip 110, and a user can grip the tab to facilitate peeling the peelable layer 140 away from the adhesive side.

In some aspects, an insert 150 can also be disposed within the interior of the outer sleeve 130. The insert 150 of the present aspect can comprise a paper material. However, in other aspects, the insert 150 can comprise any other suitable material. Various indicia 160 can be printed on or otherwise applied to the insert 150, including text and/or graphics. For example, the indicia 160 printed on the insert 150 can comprise instructions for using the tape kit 100. In some aspects, the insert 150 can also comprise indicia 160 indicating the size(s) of box(es) 210 that the corresponding tape kit 100 is suitable for sealing in the closed configuration, as described in further detail below. In other aspects, any other indicia 160 can be printed on or otherwise applied to the insert 150. In other aspects, the indicia 160 can also or alternatively be printed on or otherwise applied to the outer sleeve 130 and/or the pre-cut tape strips 110.

In the present aspect, a length of the insert 150 can be about equal to or less than a length of the outer sleeve 130, and the insert 150 can be disposed within the interior of the outer sleeve 130 either forward of or rearward of the pre-cut tape strips 110, so that the indicia 160 printed on the insert 150 is visible through the transparent material of the outer sleeve 130. In the aspect of FIG. 1B, the transverse tape strips 116 can be disposed between the insert 150 and the first and second end tape strips 112,114. In some aspects, the length of the insert 150 can be greater than the length of the outer sleeve 130. In some aspects, the insert 150 can be configured to wrap around the pre-cut tape strips 110 at the upper sleeve end 132 and/or the lower sleeve end 134, as shown in FIG. 3. In other aspects, the insert 150 may be configured to also or alternative wrap around the pre-cut tape strips 110 at the first sleeve side 136 and/or the second sleeve side 138. Other aspects of the tape kit 100 may not comprise the insert 150. Other aspects of the tape kit 100 may not comprise the outer sleeve 130, and the pre-cut tape strips 110 can be attached to the insert 150.

Figure 2:
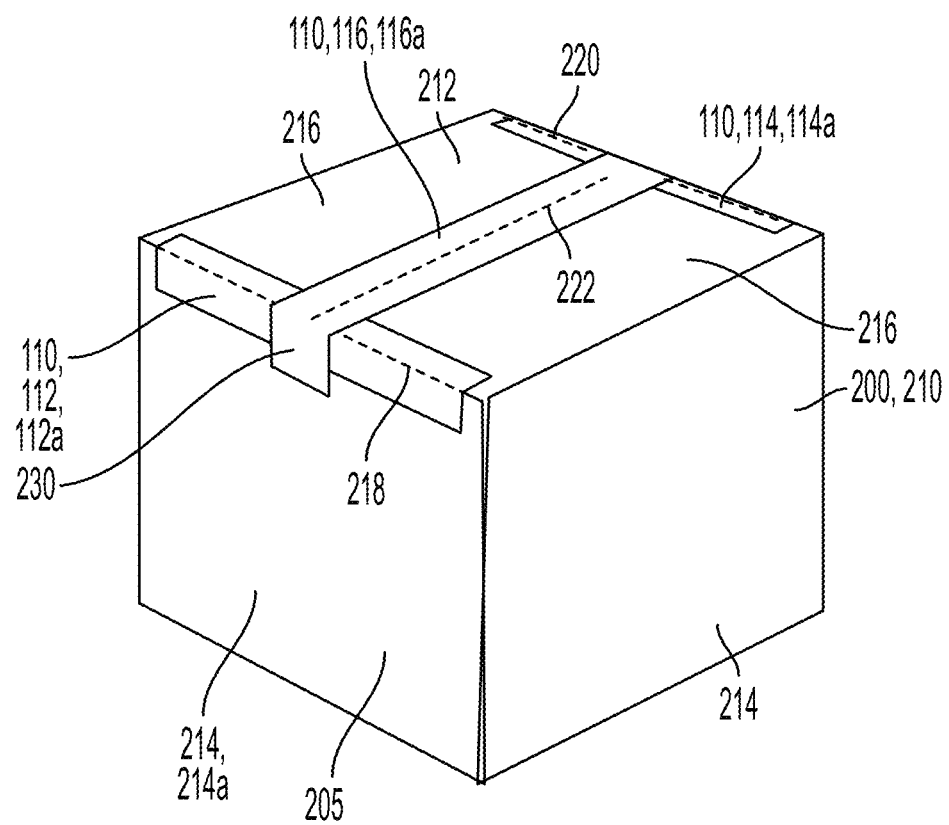
FIG. 2 is a perspective view of a box in an expanded configuration and sealed closed with the tape kit of FIG. 1.

FIG. 2 illustrates an example aspect of the box 210 sealed in the closed configuration. The top box end 212 is shown in the present view. According to example aspects, the box 210 can define a plurality of side panels 214 extending between the top box end 212 and the bottom box end 712 (shown in FIG. 7). A top box opening can be defined at the top box end 212, and a pair of top flaps 216 can be configured to selectively cover the top box opening in the closed configuration of the box 210. Similarly, a bottom box opening can be defined at the bottom box end 712, and a pair of bottom flaps 716 (shown in FIG. 7) can be configured to selectively cover the bottom box opening in the closed configuration of the box 210.

Figure 7:
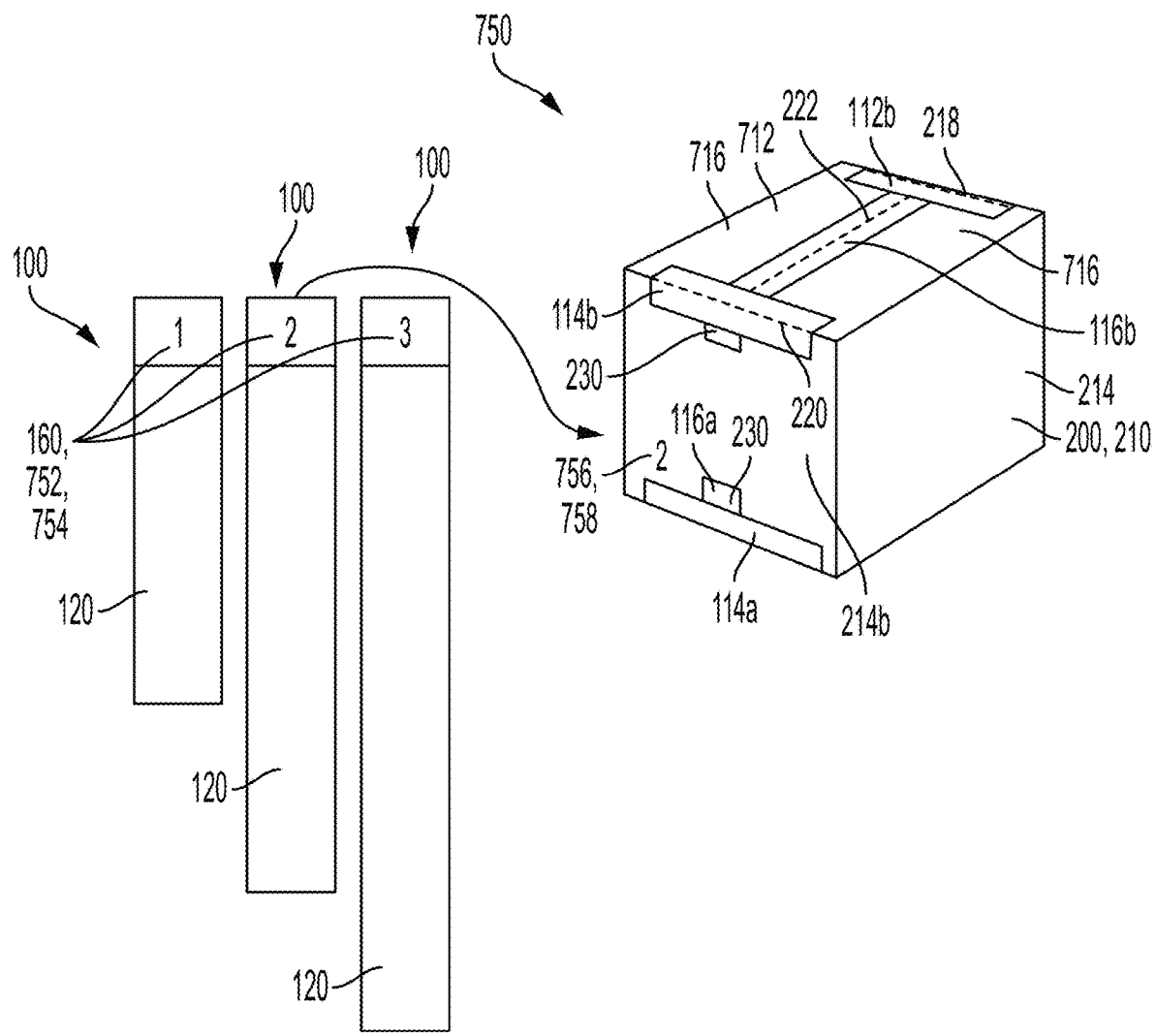
FIG. 7 illustrates a plurality of the tape kits in accordance with another aspect of the present disclosure, wherein each of the tape kits is sized to seal a box of a corresponding size.

According to example aspects, when the pair of top flaps 216 are folded to cover the top box opening, a first end seam 218 (as indicated by a dashed line) can be defined at the top box end 212 between the pair of top flaps 216 and a first one of the side panels 214a, and a second end seam 220 (as indicated by a dashed line) can be defined at the top box end 212 between the pair of top flaps 216 an opposing second one of the side panels 214b (shown in FIG. 7). Furthermore, a transverse seam 222 (as indicated by a dashed line) can be defined between the pair of top flaps 216. The transverse seam 222 can extend transversely across the top box end 212 from the first end seam 218 to the second end seam 220. The bottom box end 712 can likewise define the first end seam 218, the second end seam 220, and the transverse seam 222 when the pair of bottom flaps 716 are folded to cover the bottom box opening.

Each of the top box end 212 and the bottom box end 712 can be sealed closed by the tape kit 100 in the closed configuration. Specifically, as shown in the present view, the top box end 212 can be sealed closed by a first one of the first end tape strips 112a applied to an outer surface 205 of box 210 at the first end seam 218, a first one of the second end tape strips 114a applied to the outer surface 205 of the box 210 at the second end seam 220, and a first one of the transverse tape strips 116a applied to the outer surface 205 of the box 210 at the transverse seam 222. Similarly, the bottom box end 712 can be sealed closed by a second one of the first end tape strips 112b, a second one of the second end tape strips 114b, and a second one of the transverse tape strips 116b (each of 112b, 114b, 116b shown in FIG. 7).

In some aspects, a length of the transverse tape strip 116 can be about equal to a length of the transverse seam 222. In some aspects, as shown, the transverse tape strip 116 can be of a suitable length such that opposing ends 230 of the transverse tape strip 116 can extend beyond the transverse seam 222, across the first and second end seams 218,220, and down along the corresponding first and second side panels 214a,b. The transverse tap strip 116 can overlap the first and second end tape strips 112,114, as shown, or the first and second end tape strips 112, 114 can overlap the transverse tap strip 116, depending upon the order in which the pre-cut tape strips 110 are applied to the box 210. In other aspects, the transverse tape strip 116 may not extend over the first and second end seams 218,220 and/or may not extend down along the corresponding first and second side panels 214a,b. Additionally, in the present aspect, the first and second end tape strips 112,114 can be of a suitable length to extend substantially along a length of the corresponding first and second end seams 218,220. In other aspects, the length of the first and second end tape strips 112, 114 can be greater or lesser than the length of the first and second end seams 218,220.

Figure 5:
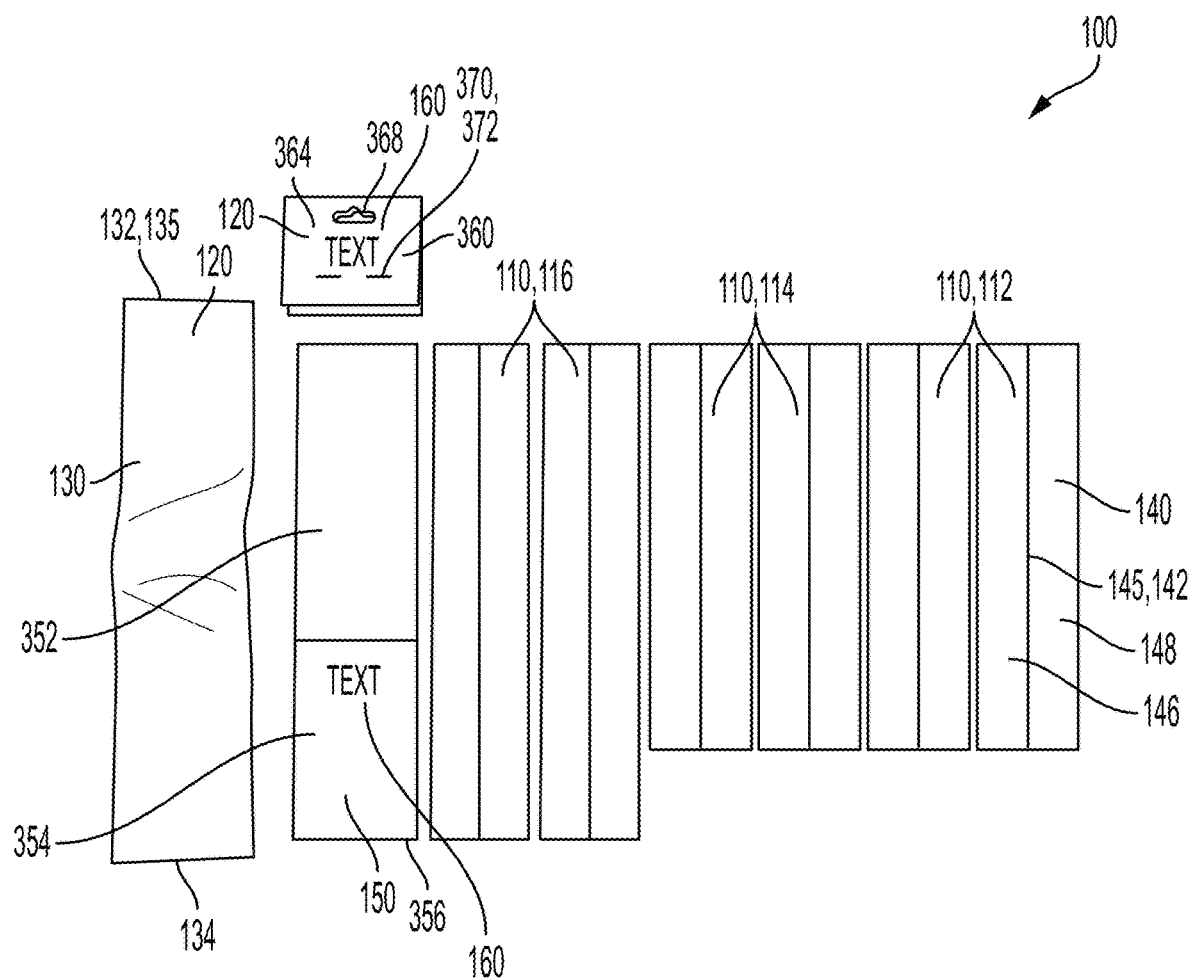
FIG. 5 is a front view of the tape kit of FIG. 3 in the unpackaged configuration.

FIGS. 3-5 illustrate the tape kit 100 according to another example aspect of the disclosure. FIG. 3 is a front view of the tape kit 100 in the packaged configuration, FIG. 4 is a rear view of the tape kit 100 in the packaged configuration, and FIG. 5 is a front view of the tape kit 100 in the unpackaged configuration. The tape kit 100 of the present aspect can be similar to the tape kit 100 of FIG. 1, but with a few differences. For example, in the packaged configuration, the insert 150 of the present aspect can define a rear insert portion 352 disposed rearward of the pre-cut tape strips 110 and a front insert portion 354 disposed forward of the pre-cut tape strips 110. The insert 150 can be folded at an insert fold line 356 between the rear insert portion 352 and the front insert portion 354 to wrap around the pre-cut tape strips 110 at the lower sleeve end 134. As shown, the indicia 160 (indicated by "text" in the drawings) can be printed on each of the rear insert portion 352 and the front insert portion 354. The indicia 160 on the rear insert portion 352 can be visible through the transparent outer sleeve 130 of the outer packaging 120 when viewing the tape kit 100 from the rear, while the indicia 160 on the front insert portion 354 can be visible through the transparent outer sleeve 130 when viewing the tape kit 100 from the front.

Additionally, the outer packaging 120 of the present tape kit 100 can further comprise a hang tag 360. The hang tag 360 can define a rear hang tag portion 362 (shown in FIG. 4) and a front hang tag portion 364 folded relative to the rear hang tag portion 362 at a tag fold line 366. According to example aspects, the upper sleeve end 132 of the outer sleeve 130 can be disposed between the front hang tag portion 364 and the rear hang tag portion 362, and the hang tag 360 can be fastened to the outer sleeve 130 to seal closed the opening 135 of the outer sleeve 130. The hang tag 360 can be fastened to the outer sleeve 130 by a fastener 370, such as a staple 372, as shown. In some aspects, the staple 372 can also engage the insert 150 and/or some or all of the pre-cut tape strips 110. In other aspects, the hang tag 360 can be fastened to the outer sleeve 130 by any other suitable fastener 370 or fastening technique.

Either or both of the front hang tag portion 364 and the rear hang tag portion 362 can also comprise indicia 160 printed thereon (as indicated by "text" in the drawings) or otherwise applied thereto. In the present aspect, both of the front and rear hang tag portions 364,362 can comprise indicia 160 thereon. Example aspects of the hang tag 360 can also define a hanging hole 368 formed therethrough. The hanging hole 368 can be configured to receive a hanger device to hang the tape kit 100 therefrom. For example, the tape kit 100 may be hung from a hanger device at a post office or another shipping or packaging facility to facilitate locating and retrieving the tape kit 100 for use and/or for displaying the tape kit 100 for sale. Example aspects of the hang tag 360 can comprise a paper material; however, other aspects of the hang tag 360 can comprise any other suitable material known in the art. Other aspects of the tape kit 100 may not comprise the insert 150. Other aspects of the tape kit 100 may not comprise the hang tag 360. Other aspects of the tape kit 100 may not comprise the outer sleeve 130, and the pre-cut tape strips 110 can be attached to the insert 150 and/or the hang tag 360. In other aspects, the indicia 160 can also or alternatively be printed on or otherwise applied to the outer sleeve 130 and/or the pre-cut tape strips 110.

Additionally, in the present aspect, instead of comprising the perforations 144 (shown in FIG. 1A), the cut lines 145 of the peelable layers 140 can each be formed as a continuous cut extending along the length of the pre-cut tape strip 110.

FIG. 6 illustrates the tape kit 100 according to another example aspect. Like the tape kits 100 previously described, the tape kit 100 of the present aspect can comprise the one or more pre-cut tape strips 110 received within the transparent outer sleeve 130 of the outer packaging 120 in the packaged configuration. However, the tape kit 100 of the present aspect does not comprise the insert 150 (shown in FIG. 1A) received in the interior of the outer sleeve 130. Rather, the outer packaging 120 of the tape kit 100 can further comprise an outer card 610 folded about and enveloping the transparent outer sleeve 130 therein, and various indicia 160, such as instructions for using the tape kit 100, can be printed on the outer card 610. Example aspects of the outer card 610 can comprise a paper material, for example and without limitation. In some aspects, a window cut-out 612 can be formed through the outer card 610 to allow for visibility of the transparent outer sleeve 130 and the pre-cut tape strips 110 therein. The window cut-out 612 can be covered with a transparent or translucent material in some aspects, such as plastic for example and without limitation. In other aspects, the window cut-out 612 can be uncovered. In other aspects, the indicia 160 can also or alternatively be printed on or otherwise applied to the outer sleeve 130 and/or the pre-cut tape strips 110.

In the present aspect, the hang tag 360 can be integrally formed with the outer card 610, as shown. The outer card 610 can define a rear card portion 614 and a front card portion 616 folded relative to the rear card portion 614 at a first card fold line 620. The outer card 610 can also define the front hang tag portion 364 folded relative to the rear card portion 614 at a second card fold line 622 opposite the first card fold line 620. The window cut-out 612 can be formed through the front card portion 616 in the present aspect. In other aspects, the window cut-out 612 can be formed through either of rear card portion 614 or the front hang tag portion 364, or the outer card 610 can comprise a plurality of the window cut-outs 612. The front hang tag portion 364 and the rear card portion 614 can define the hanging hole 368 for hanging the tape kit 100 on a hanger device. The front hang tag portion 364 can overlap a free end 618 of the front card portion 616 (or vice versa) proximate to the upper sleeve end 132 of the outer sleeve 130. The fastener 370 can attach the outer sleeve 130 to the outer card 610 and can seal the opening 135 at the upper sleeve end 132. For example, in the present aspect, the fastener 370 can be the staple 372 configured to attach the rear card portion 614 and the overlapping area of the front hang tag portion 364 and the front card portion 616 to the outer sleeve 130 at the upper sleeve end 132. Other aspects of the tape kit 100 may not comprise the outer card 610. Other aspects of the tape kit 100 may not comprise the outer sleeve 130, and the pre-cut tape strips 110 can be attached to the outer card 610. In the right-most image of FIG. 6, an assembly 650 of the outer sleeve 130 and the pre-cut tape strips 110 is enveloped by the outer card 610 and is in indicated by a dashed line.

FIG. 7 illustrates a tape kit system 750, according to an example aspect of the present disclosure. The tape kit system 750 can comprise a plurality of tape kits 100 having varying sizes of the pre-cut tape strips 110 (shown in FIG. 1A), and the tape kit system 750 can be configured to match each tape kit 100 with a box 210 or other package 200 of an appropriate size. For example, larger boxes 210 can be matched with a tape kit 100 have larger pre-cut tape strips 110, while smaller boxes 210 can be matched with a tape kit 100 having smaller pre-cut tape strips 110. According to example aspects, the indicia 160 provided on the tape kit 100 can include size-indicative indicia 752 that can indicate the appropriate size of box 210 for which the tape kit 100 can be used. Matching size-indicative indicia 756 may or may not be provided on the corresponding boxes 210 to further facilitate identifying the appropriate box 210.

In the present aspect, the size-indicative indicia 752 on the tape kits 100 can include size-indicative numbers 754, which can correspond to a matching size-indicative number 758 on the appropriate box 210. For example, small-sized boxes 210 and the corresponding tape kits 100 comprising small pre-cut tape strips 110 can be marked with a "1", medium-sized boxes 210 and the corresponding tape kits 100 comprising medium pre-cut tape strips 110 can be marked with a "2", and large-sized boxes 210 and the corresponding tape kits 100 comprising large pre-cut tape strips 110 can be marked with a "3". Other aspects of the size-indicative indicia 752 can comprise more or fewer size-indicative numbers 754 for matching the tape kits 100 to the appropriate box 210. Furthermore, in other aspects, the size-indicative indicia 752 can include any other suitable indicia 160, including colors (e.g., matching a red, blue, or green colorblock on the tape kit 100 with a red, blue, or green colorblock on the appropriate box 210), text (e.g., matching "small", "medium", or "large" text on the tape kit 100 with "small", "medium", or "large" text on the appropriate box 210), letters (e.g., matching "A", "B", or "C" on the tape kit 100 with "A", "B", or "C" on the appropriate box 210), images, or the like.

In some aspect, the boxes 210 may not comprise the matching size-indicative indicia 756, and instead, the size-indicative indicia 752 provided on the tape kits 100 can include the dimensions (or other identifying features) of the appropriate box 210. For example and without limitation, a tape kit 100 having small pre-cut tape strips 110 can be marked as suitable for use with boxes 210 sized between 2"×3" and 8"×12", while a tape kit 100 having large pre-cut tape strips 110 can be marked as suitable for use with boxes 210 sized between 8"×12" and 2'×3'. According to example aspects, the size-indicative indicia 752 can be printed on or otherwise applied at any suitable location on the outer packaging 120 and/or the pre-cut tape strips 110 of the tape kits 100, and the matching size-indicative indicia 756 (if provided) can be printed or otherwise applied at any suitable location on the corresponding boxes 210.

Figure 8:
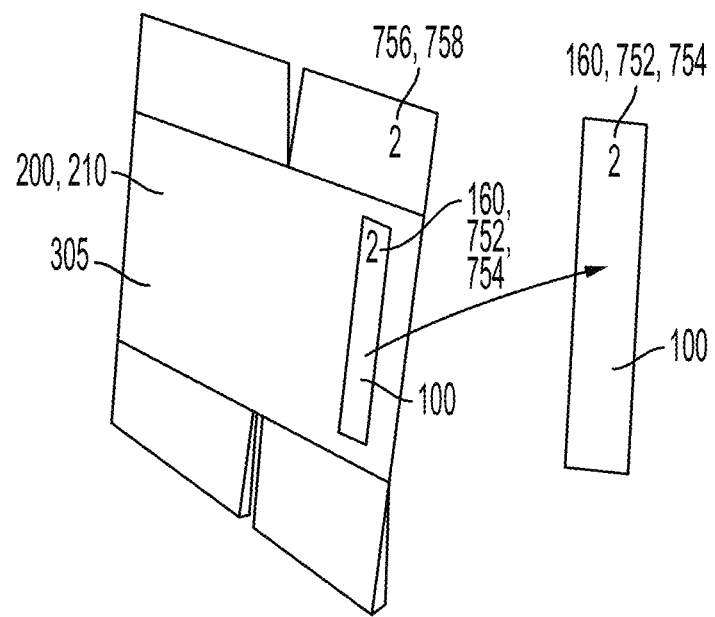
FIG. 8 illustrates the tape kit in packaged configuration and attached to a corresponding box in a collapsed configuration, in accordance with another example aspect of the present disclosure.

Referring to FIG. 8, in some aspects, the tape kit 100 can be pre-assembled with the appropriate box 210 in the packaged configuration. For example, as shown in the present aspect, the medium-sized box 210 (marked with a "2") can be provided with a tape kit 100 (also marked with a "2) having medium pre-cut tape strips 110 (shown in FIG. 1A) attached thereto. The tape kit 100 can be attached to the outer surface 205 of the box 210 or to an opposite inner surface of the box 210. The tape kit 100 can be attached to the appropriate box 210 in the packaged configuration by a fastener, such as tape, glue, staples, or any other suitable fastener known in the art. The tape kit 100 can be detached from the box 210, and the box 210 can be reconfigured from a collapsed configuration (shown) to the expanded configuration (shown in FIG. 2). The pre-cut tape strips 110 can then be used to seal the expanded box 210 in the closed configuration. In some aspects, it may not be necessary to provide the tape kit 100 and/or the box 210 with size-indicative indicia 752 and/or matching size-indicative indicia 756 when the tape kit 100 is pre-assembled with the appropriate box 210.

In some aspects, the tape kit 100 can be provided with the box 210 to be used for return shipping. For example, the box 210 can be expanded and sealed in the closed configuration, and the box 210 can be shipped to an ecommerce customer with the tape kit 100 received inside the expanded and sealed box 210. The tape kit 100 can be received loosely within the box 210, or the tape kit 100 can be attached to the inner surface of the box 210 or to contents disposed within the box 210. For example, the tape kit 100 can be attached to the inner surface of the box 210 by staples, glue, or any other suitable fastener. In other aspects, the tape kit 100 for return shipping can be attached to the outer surface 205 of the box 210. Should the ecommerce customer need to return the contents of the box 210, the pre-cut tape strips 110 of the tape kit 100 can be used to re-seal the box 210 in the closed configuration.

In some aspects, a return label may also be provided along with the tape kit 100. For example, the return label can be formed as an adhesive label having a pre-applied adhesive. The customer can adhere the provided pre-cut tape strips 110 and the adhesive return label to the box 210 to easily and securely package the box 210 for return shipping. In other aspects, the return label may not comprise the pre-applied adhesive, and the tape kit 100 can comprise pre-cut tape strips 110 that can be used to adhere the return label to the box 210.

Figure 9:
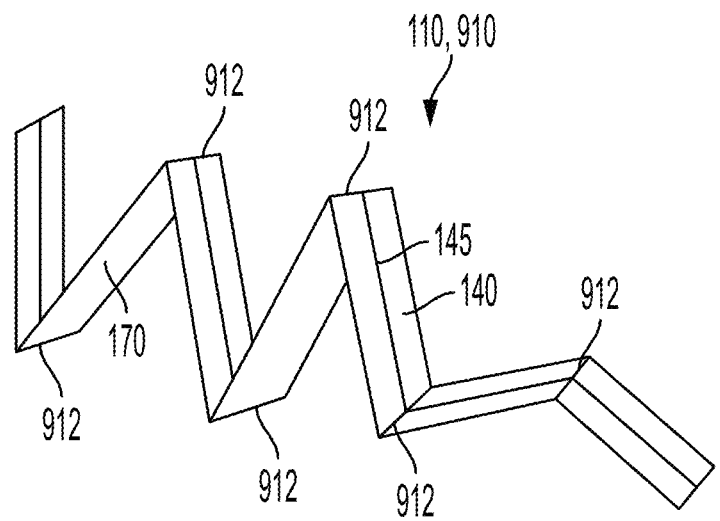
FIG. 9 illustrates a tape strip of the tape kit folded in an accordion-style, in accordance with another example aspect of the present disclosure.

FIG. 9 illustrates an example aspect of one of the pre-cut tape strips 110. The pre-cut tape strip 110 of the present aspect can be an elongated tape strip 910 for use with a considerably large box 210 (box 210 shown in FIG. 2). According to example aspects, pre-cut tape strips 110 that are longer than the outer sleeve 130 (shown in FIG. 1A) can be folded to fit within the interior thereof. For example, in the present aspect, the pre-cut tape strip 110 can be folded accordion-style at one or more strip fold lines 912. When folded, the pre-cut tape strip 110 can be suitably sized to fit inside the outer sleeve 130.

Figure 10:
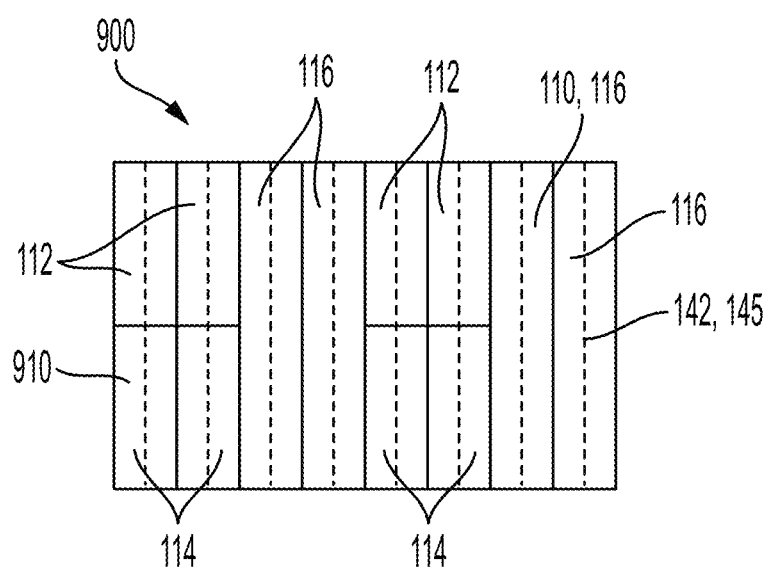
FIG. 10 illustrates tape strips of the tape kit die cut from a tape sheet, in accordance with another example aspect of the present disclosure.

Referring now to FIG. 10, the pre-cut tape strips 110 can be manufactured by any suitably method known in the art. For example, in a particular aspect, the pre-cut tape strips 110 can be manufactured by applying an adhesive to a large base sheet of the material for the base layer 170 (shown in FIG. 1A) and applying a large peelable sheet 910 of the material for the peelable layer 140 to the adhesive to form a large tape sheet 900, as shown. The large tape sheet 900 can then be flat die-cut into the pre-cut tape strips 110. The cut lines 145 formed along the longitudinal centerlines 142 of the peelable layers 140 can be cut prior to or after the large peelable sheet 910 is applied to the adhesive. In other aspects, the large base sheet and/or the large peelable sheet 910 can be flat die-cut into strips prior to applying the adhesive and/or the peelable layers 140/large peelable sheet 910 to the base layers 170/large base sheet. In other aspects, a roll of the large tape sheet 900 can be rotary cut into the pre-cut tape strips 110.

Figure 11:
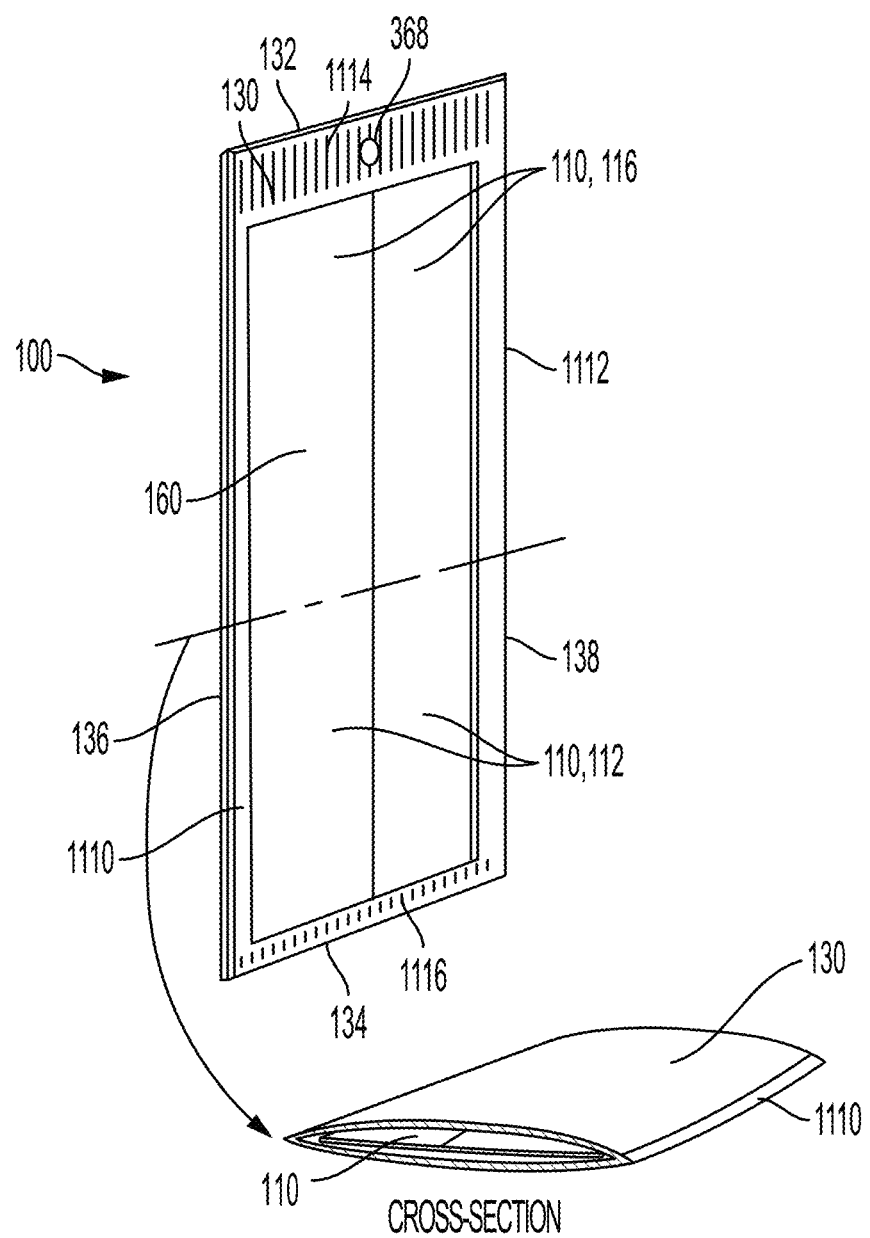
FIG. 11 illustrates the tape kit in a packaged configuration, in accordance with another example aspect of the present disclosure.

FIG. 11 illustrates the tape kit 100 according to another example aspect of the present disclosure. The tape kit 100 can comprise the outer sleeve 130, and the one or more pre-cut tape strips 110 can be received within the interior of the outer sleeve 130 in the packaged configuration. The outer sleeve 130 can comprise a plastic material in the present aspect. In other aspects, the outer sleeve 130 can comprise any other suitable material. The pre-cut tape strips 110 can comprise the pair of first end tape strips 112, the pair of second end tape strips 114 (shown in FIG. 1A), and the pair of transverse tape strips 116. In some aspects, as shown, the pair of transverse tape 116 can be arranged side-by-side within the interior of the outer sleeve 130. Similarly, the pair of first end tape strips 112 can be arranged side-by-side within the outer sleeve 130 and the pair of second end tape strips 114 (hidden between the first end tape strips 112 and the transverse tape strips 116) can be arranged side-by-side within the outer sleeve 130. In other aspects, the pre-cut tape straps 110 can be arranged in any suitable layout within the interior of the outer sleeve 130.

In the present aspect, the tape kit 100 does not comprise the insert 150 (shown in FIG. 1A), nor does the tape kit 100 comprise the outer card 610 (shown in FIG. 6). Rather, the indicia 160 can be printed directly onto the plastic outer sleeve 130. As previously described, the indicia 160 may include, for example and without limitation, instructions for using the tape kit 100 and/or the size-indicative indicia 752 (shown in FIG. 7) that can indicate the appropriate size of box 210 (shown in FIG. 2) for which the tape kit 100 can be used. In some aspects, the entire outer sleeve 130 can be substantially translucent or transparent, or select portions of the outer sleeve 130 can be translucent or transparent, to allow for visibility of the pre-cut tape strips 110 received therein. In some aspects, the entire outer sleeve 130 or portions thereof can be substantially opaque. For example and without limitation, in a particular example aspect, the outer sleeve 130 can be opaque with a transparent or translucent window portion integrally formed therewith for visibility of the pre-cut strips 110. In other aspects, the window portion can simply be an opaque portion without any indicia 160 printed thereon.

In example aspects, the plastic material of the outer sleeve 130 can be folded over itself at a second side fold line 1112 at the second sleeve side 138 thereof. A first side seam 1110 can be formed at the first sleeve side 136 to enclose the interior of the outer sleeve 130 at the first sleeve side 136. According to example aspects, the first side seam 1110 can be formed by ultrasonic or heat-sealing or by any other suitable fastener or fastening technique. In a particular example aspect, the heat-sealed first side seam 1110 can be formed during manufacture as an elongated strip of the material of the outer sleeve 130 (already folded at the second side fold line 1112) is fed through a heat-sealing machine in the direction of the first side seam 1110. In other aspects, the plastic material of the outer sleeve 130 can be folded over itself at the first sleeve side 136. In other aspects, the outer sleeve 130 can comprise a first plastic sheet overlaying a separate, second plastic sheet, and seams (such as the heat sealed seams described herein, for example) can be formed along each of the first and second sleeve sides 136,138. Alternatively, the material of the outer sleeve 130 can be folded over itself at the lower sleeve end 134 to form a lower fold line, and seams can be formed along each of the first and second sleeve sides 136,138.

The lower sleeve end 134 can then be sealed, such as by ultrasonic or heat sealing or any other suitable fastener or fastener technique, to enclose the outer sleeve 130 at the lower sleeve end 134. The pre-cut tape strips 110 can then be inserted into the interior of the outer sleeve 130, and the upper sleeve end 132 can be sealed, such as by ultrasonic or heat sealing or any other suitable fastener or fastener technique, to enclose the outer sleeve 130 at the upper sleeve end 132. Upper and lower seals 1114, 1116 can thereby be formed at the upper and lower sleeve ends 132, 134, respectively.

In some aspects, the hanging hole 368 can be formed through the outer sleeve 130 at the upper sleeve end 132. The hanging hole 368 can be configured to allow the tape kit 100 to be hung at a post office or another shipping or packaging facility. Other aspects of the tape kit 100 may not require the hanging hole 368. For example, in other aspects, the tape kit 100 in the packaged configuration can be fastened to the outer surface 205 (shown in FIG. 2) of a box 210 (such as to a collapsed box 210, as shown in FIG. 8) or to the inner surface of a box 210 (such as for ecommerce returns, as previously described). Alternatively, the tape kit 100 can be attached to contents disposed within the expanded box 210. The tape kit 100 can be attached to the box 210 or to the contents therein by any suitable fastener or fastener technique, including by not limited to, tape strips similar to the pre-cut tape strips 110 described herein, glue, staples, or the like. In other aspects, the tape kit 100 can be received loosely within the expanded box 210.

Figure 12:
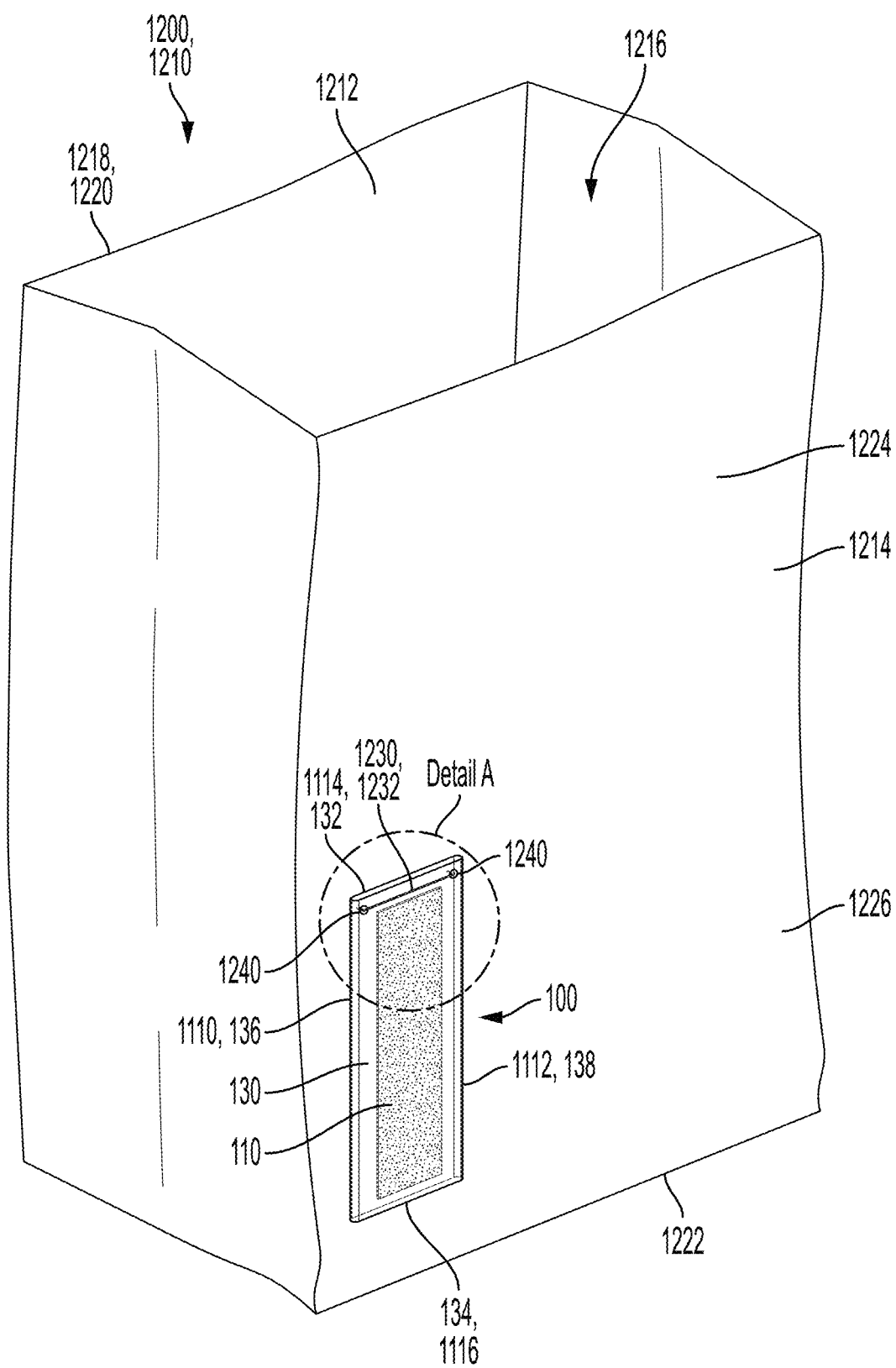
FIG. 12 illustrates the tape kit in a packaged configuration and attached to a bag, in accordance with another example aspect of the present disclosure.
Figure 13:
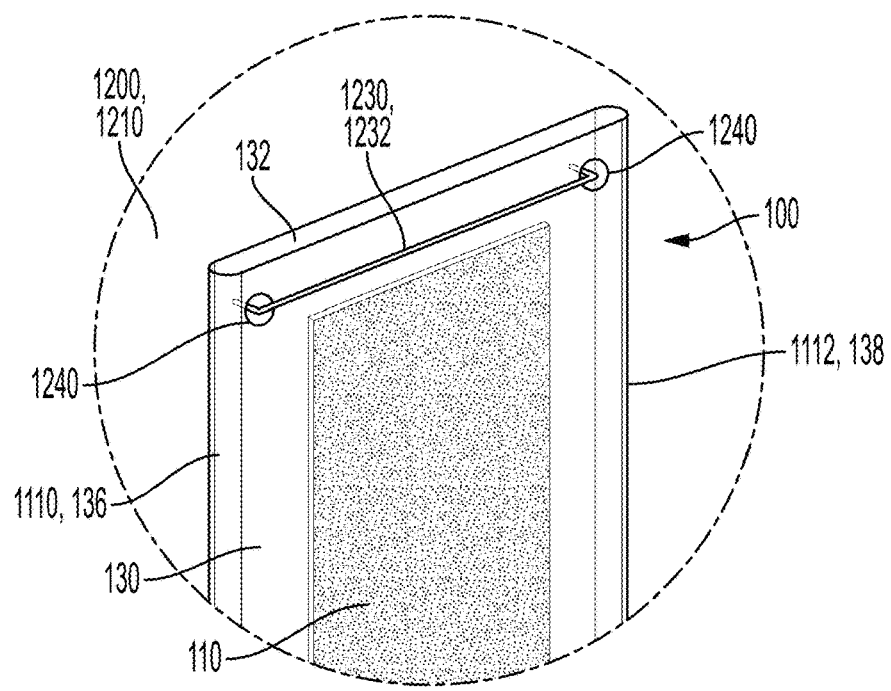
FIG. 13 illustrates a close-up view of Detail A of FIG. 12.
Figure 14:
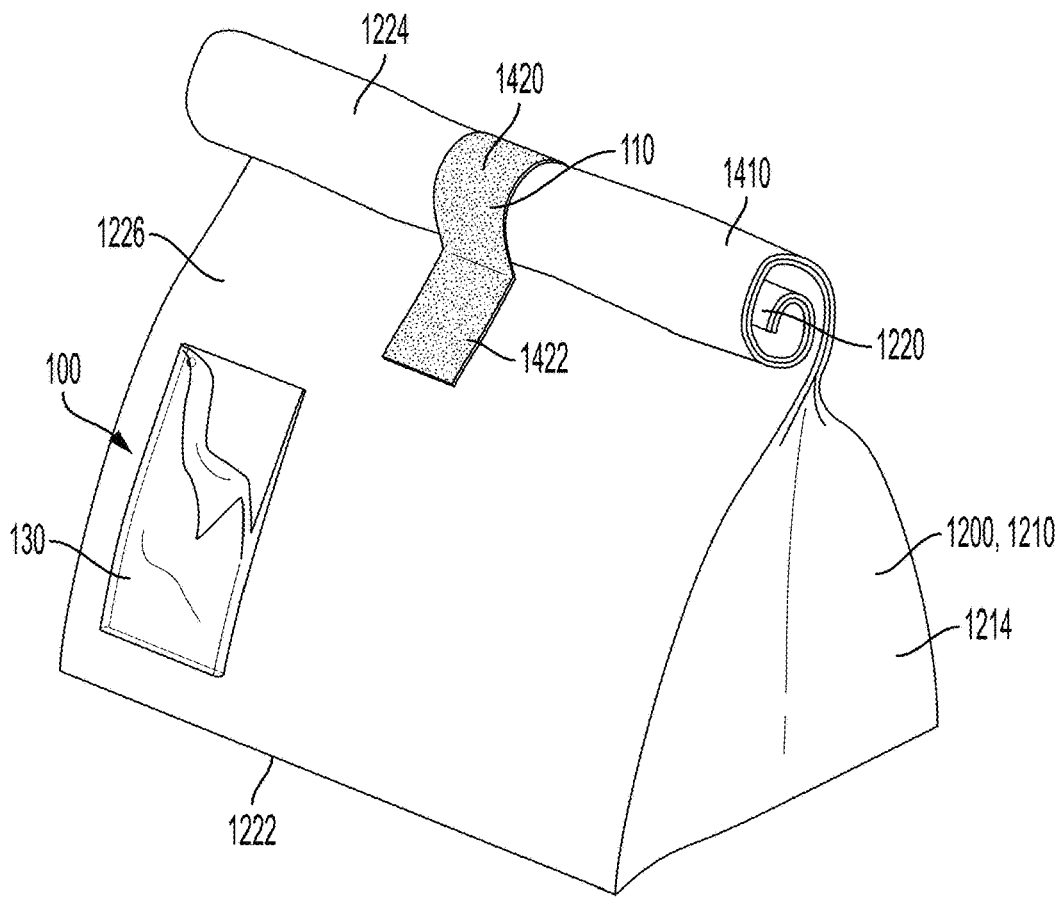
FIG. 14 illustrates the tape kit of FIG. 12 in an unpackaged and in-use configuration on the bag of FIG. 12.

FIG. 12 illustrates another example aspect of the tape kit 100 in the packaged configuration and attached to a bag 1200, and FIG. 13 is a close-up view of Detail A in FIG. 12. The bag 1200 can be, for example and without limitation, a grocery bag 1210 as shown, or any other suitable bag 1200 known in the art. The grocery bag 1210 is shown in an open configuration in FIG. 12, and the tape kit 100 can be used to seal the grocery bag 1210 in a closed configuration, as shown in FIG. 14. An inner bag surface 1212 of the grocery bag 1210 can define an interior bag void 1216. In the open configuration, the grocery bag 1210 can define a bag opening 1218 at a top bag end 1220 thereof. Contents, such as grocery items, can be inserted into the interior bag void 1216 through the bag opening 1218. The grocery bag 1210 can generally define an upper bag portion 1224 proximate to the top bag end 1220 and a lower bag portion 1226 proximate to a bottom bag end 1222 opposite the top bag end 1220.

The tape kit 100 can be attached to an outer bag surface 1214 of the grocery bag 1210, opposite the inner bag surface 1212. In the present aspect, the tape kit 100 can be attached to the lower bag portion 1226 of the grocery bag 1210; however, in other aspects the tape kit 100 can be attached to the upper bag portion 1224. The tape kit 100 of the present aspect can comprise the outer sleeve 130, and the one or more pre-cut tape strips 110 can be received within the interior of the outer sleeve 130 in the packaged configuration. The tape kit 100 can comprise a single one of the pre-cut tape strips 110 in the present aspect, but can comprise additional pre-cut tape strips 110 in other aspects. The single pre-cut tape strip 110 may or may not be folded within the outer sleeve 130.

The outer sleeve 130 can comprise a plastic material in the present aspect. The outer sleeve 130 can be substantially transparent or translucent, or select portions of the outer sleeve 130 can be substantially translucent or transparent, for visibility of the pre-cut tape strip 110 inside. In other aspects, the outer sleeve 130 or portions thereof can comprise any other suitable material and/or may be opaque. For example and without limitation, in a particular example aspect, the outer sleeve 130 can be opaque with a transparent or translucent window portion integrally formed therewith for visibility of the pre-cut strip 110. The tape kit 100 may or may not comprise the insert 150 (shown in FIG. 1A) and/or the outer card 610 (shown in FIG. 6). In some aspects, the indicia 160 (shown in FIG. 1) can be printed directly onto the plastic outer sleeve 130. As previously described, the indicia 160 may include, for example and without limitation, instructions for using the tape kit 100 or any other suitable indicia 160. Some aspects of the tape kit 100 may not comprise any of the indicia 160.

In example aspects, the plastic material of the outer sleeve 130 can be folded over itself to define the second side fold line 1112 at the second sleeve side 138 thereof. The first side seam 1110 can be formed at the first sleeve side 136 to enclose the interior of the outer sleeve 130 at the first sleeve side 136. As previously described, the first side seam 1110 can be formed by ultrasonic or heat-sealing or by any other suitable fastener or fastening technique. In a particular example aspect, the heat-sealed first side seam 1110 can be formed during manufacture as an elongated strip of the material of the outer sleeve 130 (already folded at the second side fold line 1112) is fed through a heat-sealing machine in the direction of the first side seam 1110. In other aspects, the plastic material of the outer sleeve 130 can be folded over itself at the first sleeve side 136 and a seam can be formed at the second sleeve side 138. In other aspects, the outer sleeve 130 can comprise a first plastic sheet overlaying a separate, second plastic sheet, and seams (such as the heat sealed seams described herein, for example) can be formed along each of the first and second sleeve sides 136,138. Alternatively, the material of the outer sleeve 130 can be folded over itself at the lower sleeve end 134 to form a lower fold line, and seams can be formed along each of the first and second sleeve sides 136, 138.

In the present aspect, the lower sleeve end 134 can be sealed in the same or a similar manner to the first sleeve side 136, such as by ultrasonic or heat sealing or any other suitable fastener or fastener technique, to enclose the outer sleeve 130 at the lower sleeve end 134. The pre-cut tape strip 110 can then be inserted into the interior of the outer sleeve 130 through the upper sleeve end 132. In some example aspects, the upper sleeve end 132 can then be sealed, such as by ultrasonic or heat sealing or any other suitable fastener or fastener technique, to enclose the outer sleeve 130 at the upper sleeve end 132. Upper and lower seals 1114,1116 can thereby be formed at the upper and lower sleeve ends 132, 134, respectively. In other aspects, the outer sleeve 130 may not be sealed at the upper sleeve end 132 thereof. In such an aspect, a bag fastener 1230 provided for coupling the tape kit 100 to the grocery bag 1210 at the upper sleeve end 132 can retain the pre-cut tape strip 110 within the outer sleeve 130 at the upper sleeve end 132. The bag fastener 1230 can be, for example and without limitation, a staple 1232, as shown, glue, a tape strip, plastic or fabric thread, garvey tags, or any other suitable fastener known in the art. In some aspects, one or more fastener holes 1240 can be formed through the outer sleeve 130 at the upper sleeve end 132. The fastener holes 1240 can be configured to allow the tape kit 100 to be coupled to the grocery bag 1210 by the bag fastener 1230. Other aspects of the tape kit 100 may not require the fastener holes 1240—such as in aspects wherein the bag fastener 1230 is a tape strip, for example and without limitation.

FIG. 14 illustrates the tape kit 100 of FIGS. 13 and 14 in an unpackaged and in-use configuration with the grocery bag 1210. To use the tape kit 100 with the grocery bag 1210, the outer sleeve 130 of the tape kit 100 can be opened (e.g., torn or cut open, for example) and the pre-cut tape strip 110 therein can be removed. The outer sleeve 130 can remain attached to the grocery bag 1210 after removing the pre-cut tape strip 110, as shown, or can be detached therefrom. The upper bag portion 1224 of the grocery bag 1210 can be rolled or folded over itself at the top bag end 1220 to close the bag opening 1218 and retain the contents within the interior bag void 1216 (shown in FIG. 12). The upper bag portion 1224 can thereby form a folded or rolled portion 1410 of the grocery bag 1210 at the top bag end 1220 in the closed configuration. To secure the grocery bag 1210 in the closed configuration and prohibit the rolled portion 1410 from unraveling, a first strip portion 1420 of the pre-cut tape strip 110 can be applied to the rolled portion 1410 of the grocery bag 1210 and a second strip portion 1422 of the pre-cut tape strip 110 can be applied to the lower bag portion 1226, thereby securing the rolled portion 1410 in position relative to the lower bag portion 1226.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A tape kit comprising:
   an outer packaging;
   a first end tape strip configured to seal a first end seam of a package;
   a second end tape strip configured to seal a second end seam of the package;
   a transverse tape strip configured to seal a transverse seam of the package, wherein each of the first end tape strip, the second end tape strip and the transverse tape strip are at least partially surrounded by the outer packaging in a packaged configuration; and
   an insert disposed within the outer packaging;

wherein;
the transverse tape strip is disposed between the insert and the first and second end tape strips;
the outer packaging comprises an outer sleeve;
the outer sleeve defines an upper sleeve end, a lower sleeve end opposite the upper sleeve end, a first sleeve side, and a second sleeve side opposite the first sleeve side;
the outer sleeve is sealed at at least the first sleeve side, the second sleeve side, and the lower sleeve end;
each of the first end tape strip, the second end tape strip, and the transverse tape strip are received within an interior of the outer sleeve;
at least a portion of the outer sleeve comprises a transparent or translucent material for visibility into the interior of the outer sleeve;
a front insert portion of the insert is disposed within the interior of the outer sleeve between a front sleeve portion of the outer sleeve and the first end tape strip, the second end tape strip, and the transverse tape strip;
the insert comprises indicia printed thereon;
the indicia comprises instructions for using the tape kit; and
the indicia is visible through the transparent or translucent material of the outer sleeve.

2. The tape kit of claim 1, wherein the outer sleeve comprises a plastic material.

3. The tape kit of claim 1, wherein the insert is wrapped around the first end tape strip, the second end tape strip, and the transverse tape strip within the interior of the outer sleeve to define the front insert portion and a rear insert portion.

4. The tape kit of claim 1, further comprising a hang tag fastened to the outer sleeve at the upper sleeve end, wherein:
the hang tag defines a hanger hole therethrough;
the hanger hole is configured to receive a hanger device for hanging the tape kit therefrom; and
the hang tag comprises indicia printed thereon.

5. The tape kit of claim 4, wherein:
the hang tag comprises a rear hang tag portion and a front hang tag portion folded relative to the rear hang tag portion at a tag fold line; and
the upper sleeve end of the outer sleeve is disposed between the front hang tag portion and the rear hang tag portion.

6. The tape kit of claim 1, wherein each of the first end tape strip, the second end tape strip and the transverse tape strip comprise:
a base layer defining a first side and a second side opposite the first side;
an adhesive applied to the first side to form an adhesive side, and wherein the second side is a non-adhesive side; and
a peelable layer applied to the adhesive side to cover the adhesive before use, wherein the peelable layer can be selectively peeled away from the adhesive side to expose the adhesive.

7. The tape kit of claim 6, wherein:
each of the first end tape strip, the second end tape strip, and the transverse tape strip define a longitudinal centerline; and
the peelable layer is cut or weakened along the longitudinal centerline to facilitate removing the peelable layer from the adhesive side.

8. The tape kit of claim 1, wherein:
each of the first end tape strip, the second end tape strip, and the transverse tape strip are configured to seal the package a first package end thereof;
the tape kit further comprises:
a third end tape strip configured to seal a third end seam of the package;
a fourth end tape strip configured to seal a fourth end seam of the package; and
a second transverse tape strip configured to seal a second transverse seam of the package; and
each of the third end tape strip, the fourth end tape strip and the second transverse tape strip are configured to seal the package a second package end thereof, opposite the first package end.

9. A tape kit comprising:
an outer packaging;
a first end tape strip configured to seal a first end seam of a package;
a second end tape strip configured to seal a second end seam of the package;
a transverse tape strip configured to seal a transverse seam of the package, wherein each of the first end tape strip, the second end tape strip and the transverse tape strip are at least partially surrounded by the outer packaging in a packaged configuration; and
and insert;
wherein:
the outer packaging comprises an outer sleeve comprising a plastic material;
the outer sleeve defines an upper sleeve end, a lower sleeve end opposite the upper sleeve end, a first sleeve side, and a second sleeve side opposite the first sleeve side;
the outer sleeve is heat sealed at at least the first sleeve side, the second sleeve side, and the lower sleeve end;
each of the first end tape strip, the second end tape strip, and the transverse tape strip are received within an interior of the outer sleeve;
at least a portion of the outer sleeve comprises a transparent or translucent material for visibility into the interior of the outer sleeve;
a front insert portion of the insert is disposed within the interior of the outer sleeve between a front sleeve portion of the outer sleeve and the first end tape strip, the second end tape strip, and the transverse tape strip;
the insert comprises indicia printed thereon;
the indicia comprises instructions for using the tape kit; and
the indicia is visible through the transparent or translucent material of the outer sleeve.

10. The tape kit of claim 9, wherein the insert is wrapped around the first end tape strip, the second end tape strip, and the transverse tape strip within the interior of the outer sleeve to define the front insert portion and a rear insert portion.

11. The tape kit of claim 9, further comprising a hang tag fastened to the outer sleeve at the upper sleeve end, wherein:
the hang tag defines a hanger hole therethrough;
the hanger hole is configured to receive a hanger device for hanging the tape kit therefrom; and
the hang tag comprises indicia printed thereon.

12. The tape kit of claim 11, wherein:
the hang tag comprises a rear hang tag portion and a front hang tag portion folded relative to the rear hang tag portion at a tag fold line; and the upper sleeve end of the outer sleeve is disposed between the front hang tag portion and the rear hang tag portion.

13. The tape kit of claim 9, wherein each of the first end tape strip, the second end tape strip and the transverse tape strip comprise:
    a base layer defining a first side and a second side opposite the first side;
    an adhesive applied to the first side to form an adhesive side, and wherein the second side is a non-adhesive side; and
    a peelable layer applied to the adhesive side to cover the adhesive before use, wherein the peelable layer can be selectively peeled away from the adhesive side to expose the adhesive.

14. The tape kit of claim 13, wherein:
    each of the first end tape strip, the second end tape strip, and the transverse tape strip define a longitudinal centerline; and
    the peelable layer is cut or weakened along the longitudinal centerline to facilitate removing the peelable layer from the adhesive side.

15. The tape kit of claim 9, wherein:
    each of the first end tape strip, the second end tape strip, and the transverse tape strip are configured to seal the package a first package end thereof;
    the tape kit further comprises:
    a third end tape strip configured to seal a third end seam of the package;
    a fourth end tape strip configured to seal a fourth end seam of the package; and
    a second transverse tape strip configured to seal a second transverse seam of the package; and
    each of the third end tape strip, the fourth end tape strip and the second transverse tape strip are configured to seal the package a second package end thereof, opposite the first package end.

* * * * *